(12) United States Patent
Best et al.

(10) Patent No.: US 8,168,331 B2
(45) Date of Patent: May 1, 2012

(54) ELECTROCHEMICAL ELEMENT FOR USE AT HIGH TEMPERATURES

(75) Inventors: Adam Samuel Best, Delft (NL); Hiske Landheer, Delft (NL); Franciscus Güntherus Bernardus Ooms, Delft (NL)

(73) Assignee: Shell Oil Company, Houston, TX (US)

( * ) Notice: Subject to any disclaimer, the term of this patent is extended or adjusted under 35 U.S.C. 154(b) by 1302 days.

(21) Appl. No.: 10/584,379

(22) PCT Filed: Nov. 30, 2004

(86) PCT No.: PCT/EP2004/053182
§ 371 (c)(1),
(2), (4) Date: Apr. 11, 2007

(87) PCT Pub. No.: WO2005/064733
PCT Pub. Date: Jul. 14, 2005

(65) Prior Publication Data
US 2007/0254213 A1    Nov. 1, 2007

(30) Foreign Application Priority Data
Dec. 29, 2003 (EP) .................................... 03104985

(51) Int. Cl.
*H01M 4/58* (2010.01)
(52) U.S. Cl. ................ 429/231.95; 429/231.1; 429/221; 429/224; 429/231.5; 429/231.6; 429/218.1; 429/322; 361/504
(58) Field of Classification Search ............ 429/231.95, 429/231.1, 221, 224, 231.5, 231.6, 218.1, 429/322; 361/504
See application file for complete search history.

(56) References Cited

U.S. PATENT DOCUMENTS

| | | | |
|---|---|---|---|
| 5,827,602 A | 10/1998 | Koch et al. | 429/194 |
| 5,855,809 A | 1/1999 | Angell et al. | 252/62.2 |
| 5,965,054 A | 10/1999 | McEwen et al. | 252/62.2 |
| 6,326,104 B1 | 12/2001 | Caja et al. | 429/188 |
| 6,365,301 B1 | 4/2002 | Michot et al. | |
| 6,465,129 B1 * | 10/2002 | Xu et al. | 429/224 |
| 6,514,640 B1 * | 2/2003 | Armand et al. | 429/231.1 |
| 6,551,744 B1 * | 4/2003 | Ohzuku et al. | 429/223 |

(Continued)

FOREIGN PATENT DOCUMENTS
EP    1207571    5/2002
(Continued)

OTHER PUBLICATIONS
International Search Report of PCT/EP2004/053182 dated Feb. 18, 2005.

(Continued)

*Primary Examiner* — Laura Weiner

(57) ABSTRACT

An electrochemical element for use at a high temperature has an anode, a cathode comprising an intercalation material having an upper reversible potential-limit of at most 4 V versus Li/Li+ as active material, and an electrolyte arranged between the cathode and anode, which electrolyte comprises an ionic liquid with an anion and a cation a pyrrolidinium ring structure having four Carbon atoms and one Nitrogen atom. Experiments revealed that rechargeable batteries comprising such an intercalation material and N—$R_1$—N—$R_2$-pyrrolidinium, wherein $R_1$ and $R_2$ are alkyl groups and $R_1$ may be methyl and $R_2$ may be butyl or hexyl, are particularly suitable for use at a temperature of up to about 150 degrees Celsius and may be used in oil and/or gas production wells.

20 Claims, 9 Drawing Sheets

Pyrrolidinium cations pyrrolidinium ring structure:
$R_1$-$R_{10}$ is e.g. H, F, alkylgroup, etc.

U.S. PATENT DOCUMENTS

| | | |
|---|---|---|
| 6,552,843 B1 | 4/2003 | Tench et al. ............... 359/321 |
| 7,722,989 B2 * | 5/2010 | Ohzuku et al. ............. 429/231.3 |
| 2002/0055045 A1 | 5/2002 | Michot et al. |
| 2002/0064704 A1 | 5/2002 | Thackeray et al. |
| 2002/0177039 A1 | 11/2002 | Lu et al. |

FOREIGN PATENT DOCUMENTS

| | | |
|---|---|---|
| WO | 01/15258 | 3/2001 |
| WO | 01/80344 | 10/2001 |
| WO | 02/09215 | 1/2002 |
| WO | 02/063073 | 8/2002 |
| WO | 2004/082059 | 9/2004 |

OTHER PUBLICATIONS

Macfarlane D R, et al: "Pyroolidinium imides: a new family of molten salts and conductive plastic crystal phases" May 20, 1999, Jrnl. of Physical Chemistery. B, Materials, Surfaces, Interfaces and Biophysical, Washington, DC, US, pp. 4164-4170.

* cited by examiner

Fig. 1A. Pyrrolidinium cations
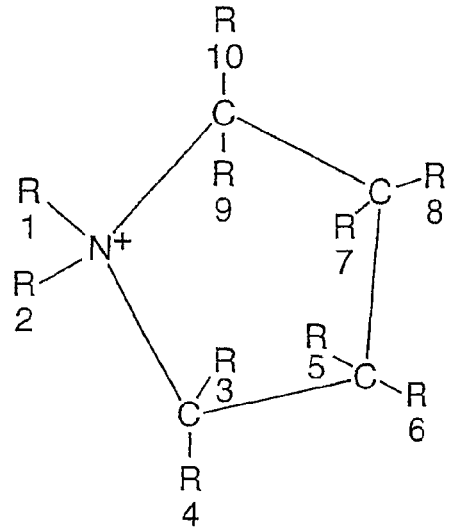
pyrrolidinium ring structure:
$R_1$-$R_{10}$ is e.g. H, F, alkylgroup, etc.
Fig. 1B.
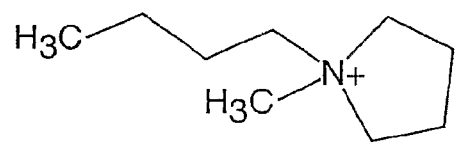
1-butyl-1-methylpyrrolidinium
Fig. 1C.
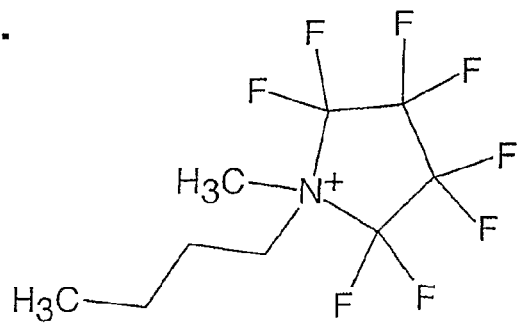
1-butyl-2,2,3,3,4,4,5,5-octafluoro-1-methylpyrrolidinium

ELECTROCHEMICAL ELEMENT FOR USE AT HIGH TEMPERATURES

PRIORITY CLAIM

The present application claims priority on European Patent Application 03104985.1 filed 29 Dec. 2003.

FIELD OF THE INVENTION

Background of the Invention

This invention relates to an electrochemical element for use at high temperatures.

Electrochemical elements comprise a cathode and an anode, and an electrolyte which is arranged between the cathode and the anode. The cathode and anode generally comprise metallic current collectors and an active material, which can be the current collector material itself. An electrochemical cell that produces electricity as a result of a spontaneous chemical reaction is called a galvanic cell. An electrochemical element or cell in which a non-spontaneous chemical reaction is driven by an external current source is called an electrolytic cell.

An electrolyte is a compound, or combination of compounds, capable of conducting electricity in the form of an ionic current, carried by mobile ions. Examples of an electrolyte are a salt, or a mixture of salts, in its solid or molten state or dissociated into its ions in a solvent in which the solvent is not or only slightly dissociated.

Electrochemical elements may be configured as a primary battery or a rechargeable battery or an electrochemical capacitor. Rechargeable batteries are often referred to as secondary batteries and non-rechargeable batteries are often referred to as primary batteries.

A battery is a device that stores electrical energy using one or more electrochemical cells. The cells can be connected in series or parallel. The physical construction of a cell is such that a direct reaction of the chemicals stored in the electrodes is prohibited by physically separating the electrodes by an electrolyte. When the two electrodes are connected through an external circuit, a galvanic cell will produce an electrical current. Electrons will flow through the external circuit, ions will flow through the electrolyte.

The reactions at the electrodes, involving transfer of electrons from one substance to another and thus the reduction and oxidation of the substances, are called redox reactions. The electrode where oxidation takes place is called the anode, the electrode where reduction takes place is called the cathode.

A rechargeable battery is a battery or electrochemical cell in which the chemical reaction, producing the electrical current upon discharge, is easily chemically reversible. A rechargeable battery can be recharged by applying an electrical current to its electrodes or terminals. Preferably, a rechargeable battery can be recharged hundreds of times without significant loss of storage capacity. A primary battery can be discharged only once and has to be disposed off afterwards.

The active material of the positive electrode in a primary battery will be reduced in the discharge process and is therefore also known as the cathode material. Vice versa is material at the negative electrode known as the anode material. The same naming convention is used for the active materials of a rechargeable battery in its charged state (a galvanic cell).

Batteries are widely used as a source of electrical energy for a variety of applications. Rechargeable batteries are used for many applications to avoid the replacement and disposal of primary batteries. Moreover, their use allows the remote operation of devices in difficult to reach locations where exchange of primary batteries is not practically possible but where recharging a battery would be feasible. An example of such a location is in a wellbore for oil and gas production. Not only are downhole locations difficult to reach, the environmental conditions are also harsh with temperatures in the range of 60 to 200° C. which demands an electrochemical element suitable for high temperatures.

Most batteries are configured for use in a specified temperature range, which is typically capped due to instability, disintegration, melting and/or evaporation of the chemical compounds in the battery above a certain temperature. A typical operating range for batteries is between −40 and +60° C.

Many rechargeable battery chemistries have been developed. Examples are Lead-acid, Nickel-Cadmium, Nickel-metalhydride, and Lithium (Lithium-metal and Lithium-ion) batteries. From these, batteries based on Lithium chemistry are most interesting since they offer the highest energy density because Lithium has the lowest reduction potential known (−3.045 V versus a standard hydrogen electrode) and has a high specific storage capacity of 3828 mAh/g (for a Lithium 7 isotope=$^7$Li). However, the formation of Lithium dendrites on the Lithium anode in rechargeable batteries with electrolytes based on organic solvents has been a safety concern. This has led to the development of Lithium-ion batteries (Li-ion) in which the Lithium anode has been replaced with an intercalation material.

An intercalation or insertion compound is a host compound in which a guest species can be stored or from which it can be extracted. Examples of three dimensional intercalation materials are $LiMn_2O_4$ and $Li_4Ti_5O_{12}$ which reversibly allow the extraction and/or insertion of Lithium ions as guest species from/in their cubic crystal lattice structures.

An intercalation-reaction or insertion-reaction is defined as a reaction, generally reversible, that involves the introduction or removal of a guest species into or from a host structure without a major structural modification of the host. In the strictest sense, intercalation refers to the insertion of a guest into a two-dimensional host; however, the term also now commonly refers to one-dimensional and three-dimensional host structures. An example is the insertion of Lithium into layered $TiS_2$: $x\,Li+TiS_2 \rightarrow Li_xTiS_2$ ($0 \leq x \leq 1$) (this example is described in the IUPAC Compendium of Chemical Terminology, 2nd Edition, 1997). Here, x is the variable amount of Lithium intercalated in $TiS_2$. The given limits ($0 \leq x \leq 1$) indicate the compositional range over which x can be varied in a reversible way. Between these limits, $Li_xTiS_2$ exhibits a specific potential curve as function of x when measured versus a suitable reference electrode, which is Lithium metal in case of Lithium intercalation. Many reversible intercalation materials are known, each having a specific potential curve associated with a specific reversible composition range ($x_{min} \leq x \leq x_{max}$). These potential curves can be characterised by a lower- and an upper reversible-potential-limit ($RPL_{low}$ and $RPL_{upp}$, respectively) and an average potential $V_{avg}$. Some examples are given in table 1.

TABLE 1

Intercalation materials with reversible composition range and associated capacity, $RPL_{low}$, average-potential, and $RPL_{upp}$ versus $Li/Li^+$. Potentials for $Mg_xMo_3S_4$ are versus $Mg/Mg^{2+}$.

| Material | ($x_{min} \leq x \leq x_{max}$) | C (Ah/kg) | $RPL_{low}$ (V) | $V_{avg}$ (V) | $RPL_{upp}$ (V) |
|---|---|---|---|---|---|
| $Li_{1+x}CrTiO_4$ | $0 \leq x \leq 1$ | 157 | 1.0 | 1.5 | 2.0 |
| $Li_{4+x}Ti_5O_{12}$ | $0 \leq x \leq 3$ | 175 | 1.05 | 1.55 | 2.05 |
| $Li_{4+x}Mn_5O_{12}$ | $0 \leq x \leq 3$ | 161 | 2.4 | 2.9 | 3.3 |
| $Li_xTiS_2$ | $0 \leq x \leq 1$ | 240 | 1.5 | 2.1 | 2.5 |
| $Li_{1+x}Ni_{0.5}Mn_{1.5}O_4$ | $0 \leq x \leq 1$ | 146 | 2.5 | 2.9 | 3.3 |
| $Li_{1+x}Mn_2O_4$ | $0 \leq x \leq 1$ | 148 | 2.5 | 2.9 | 3.3 |

TABLE 1-continued

Intercalation materials with reversible composition range and associated capacity, $RPL_{low}$, average-potential, and $RPL_{upp}$ versus Li/Li$^+$. Potentials for $Mg_xMo_3S_4$ are versus $Mg/Mg^{2+}$.

| Material | ($x_{min} \leq x \leq x_{max}$) | C (Ah/kg) | $RPL_{low}$ (V) | $V_{avg}$ (V) | $RPL_{upp}$ (V) |
|---|---|---|---|---|---|
| $Li_{1-x}FePO_4$ | $0 \leq x \leq 1$ | 160 | 3.0 | 3.4 | 3.8 |
| $Li_{1-x}Mn_2O_4$ | $0 \leq x \leq 0.8$ | 120 | 3.5 | 4.1 | 4.2 |
| $Mg_xMo_3S_4$ | $0 \leq x \leq 1$ | 120 | 0.2 | 1.1 | 2.0 |

The potentials measured versus Mg/Mg$^{2+}$ can easily be converted to potentials versus Li/Li$^+$ by using the known reduction potentials versus the standard hydrogen electrode (SHE): Li$^+$+e=Li−3.045 V and Mg$^{2+}$+2e=Mg−2.375 V. This means that the upper cut-off potential of $Mg_xMo_3S_4$ of 2.0 V versus Mg/Mg$^{2+}$ becomes 2.67 V versus Li/Li$^+$.

In the field of batteries, it is common to use so called lower- and upper cut-off potentials. These do not necessarily coincide with the RPL potentials of the active materials used. The cut-off potentials are a means of controlling the composition of the intercalation material in a battery and determine the utilisation of the storage capacity. Setting the cut-off potentials to a window wider than the window defined by the RPL values may result in the irreversible oxidation or reduction of the active materials and/or the electrolyte, leading ultimately to failure of the battery. Setting the cut-off potentials to a window smaller than the RPL window results in a lower utilisation of the storage capacity of the active materials, but in general leads to a longer battery life. The current state-of-the-art Lithium and Li-ion batteries comprise positive electrode (cathode) materials like $MnO_2$, $LiCoO_2$, $LiNi_{0.8}Co_{0.2}O_2$, and $LiMn_2O_4$. Carbonaceous materials like graphite, MCMB, and petroleum coke are used as negative (anode) materials in Li-ion batteries. Batteries made by a combination of such cathode and anode materials show attractive high voltages between 3 and 4 V.

The electrolytes used in these batteries are based on Lithium salts as for example $LiPF_6$, $LiBF_4$, $LiClO_4$, and $LiAsF_6$ dissolved in (mixtures of) organic solvents like for example ethylene-carbonate (EC), di-methyl-carbonate (DMC), propylene-carbonate (PC), ethyl-methyl-carbonate (EMC) etc. These solvents are flammable and show considerable vapour pressures at temperatures above 60° C. Furthermore, these electrolytes can strongly react with the other battery components if the battery temperature rises above 60° C., for example in the case of over-charging or internal shorting, imposing a potential danger. The operating temperature range is therefore limited from about −40° C. to +80° C., which is similar to that found for the aqueous electrolytes.

Rechargeable battery chemistries that are able to operate at higher temperatures can be found in the molten salt systems, for example the system Li//FeS$_2$ which, depending on the composition of the electrolyte, operates between 350 and 550° C., or the system Na//S which operates between 220 and 350° C. Therefore, there is a gap in the operating temperature range of current rechargeable battery technology between about 80 and 220° C. The reason for this gap lies in the inadequate thermal properties of the available electrolytes.

The current technology of primary batteries, however, does not show such a temperature gap. The system Li//SO$_2$Cl operates between −40 and +150° C. or, by alloying Lithium with Magnesium, between 70 to 200° C. In this battery chemistry the electrolyte is the in-situ reaction product when Lithium metal contacts SO$_2$Cl.

International patent application WO 01/15258 (D. R. MacFarlane et al.) discloses a solid-state conductive material comprising a pyrrolidinium or other cation. It further discloses that an anode of a Lithium battery may comprise a Lithium intercalation material.

Recent advances in the research of so called ionic liquids have shown that these materials have very promising properties to be used for a new generation of battery electrolytes, especially for high temperature batteries. Ionic liquids are known and have gained a lot of attention for their suitability in green chemistry. In contrast to the organic solvents, ionic liquids are non-flammable, non-volatile, and are chemically stable over a wide temperature range, up to 400° C. Furthermore, they can be mixed with a wide range of electrolyte salts, allowing very high electrolyte salt concentrations. The conductivities of these electrolytes is comparable or sometimes higher than comparable organic solvent based systems. Many of the ionic liquids are in their liquid state in a wide temperature range, starting below room temperature and ranging up to about 400° C.

An article by D. R. MacFarlane, et al., (Journal of Phys. Chem. B, 103 (20) 1999, 4164) discloses that, among the known ionic liquids, some members of the pyrrolidinium family of ionic liquids show the widest electrochemical stability windows of up to 5.5 V, measured between glassy-carbon electrodes at 25° C. The electrolyte stability window is the potential range, bounded by an oxidation- and a reduction-potential, in which the electrolyte is not oxidised nor reduced.

It is known for organic-solvent based electrolytes that a wider stability window is found when inert electrodes are used, like glassy-carbon or Platinum, than when electrodes containing active materials are used, like intercalation compounds. In that case, smaller electrolyte stability windows are found due to interaction of the electrolyte with the active materials. Furthermore, increasing the temperature enhances these interactions, resulting in an even smaller stability window. The large stability window of the pyrrolidinium based ionic liquids renders them as especially interesting for the application in electrolytes for use at high temperatures.

It is known that ionic liquids may be used as an electrolyte in electrochemical elements if an electrolyte salt (e.g. a Lithium salt) is added to the ionic liquid in order to obtain ionic conductivity of the required ion. The term ionic liquid is not well defined in literature but refers in general to a molten salt or to a liquid which consists of fully or almost fully dissociated ions. Room temperature ionic liquids are thus ionic liquids that are in the liquid state at room temperature. 'Room temperature' is often defined as a temperature close to 25° C. but can be as high as 80° C. It has to be noted therefore that not all compounds classified as 'ionic liquids' in the open literature have a melting point below 80° C.

It is known that in electrochemical elements that are configured for use at temperatures below 60° C. the electrolyte layer may comprise an extensive range of materials with ionic conductivity, such as electrolyte solutions comprising salts, which are dissociated into ions when dissolved in a solvent.

U.S. Pat. No. 5,827,602 (Covalent Associates, Inc.) discloses the hydrophobic ionic liquids based on cations comprising pyridinium, pyridazinium, pyrimidinium, pyrazinium, imidazolium, pyrazolium, thiazolium, oxazolium, and triazolium. Also disclosed is the use of these ionic liquids in an electrochemical cell or a capacitor. No evidence of a stable functioning rechargeable battery incorporating these ionic liquids is shown and no operating temperature range is claimed.

U.S. Pat. No. 5,965,054 (Covalent Associates, Inc.) discloses the use of the hydrophobic ionic liquids based on cations comprising pyridinium, pyridazinium, pyrimidinium, pyrazinium, imidazolium, pyrazolium, thiazolium, oxazolium, and triazolium in an electrolyte with a salt dissolved in a polar organic liquid or dissolved in liquid sulfur dioxide. The use of a polar solvent renders the known electrolyte not suitable for high temperature applications due to vapour formation. No evidence of a stable functioning rechargeable battery incorporating these ionic liquids is shown and no operating temperature range is claimed.

U.S. Pat. No. 6,326,104 (Electrochemical Systems, Inc.) discloses the use of electrolytes based on ionic liquids comprising the pyrazolium cation. This prior art reference provides four examples related to Lithium rechargeable batteries (a $LiMn_2O_4$ cathode and a Lithium metal anode), wherein one cell was tested at 55° C. and three cells were tested at room temperature. All cells showed lower then expected capacities and/or fading, i.e. only an indication is given of the potential use. Also, a description was given that the following ionic liquids were not stable against metallic Lithium: 1-ethyl-3-methyl-imidazolium-tetrafluoroborate and 1,2-dimethyl-3-propylimidazolium-tetrafluoroborate.

U.S. Pat. No. 5,855,809 (Arizona Board of Regents) discloses the use of electrolytes based on the following ionic liquids: $X_3PNPOX_2$, $X_3PNCH_3$, $X_3PNSO_2X$, $XSO_2CH_3$, $CH_3COX$, and $CH_3CH_2NPX_3$ where X is a halogen atom. The results of one battery test are shown for a cell comprising a $LiMn_2O_4$ cathode and a Lithium metal anode with $0.3LiAlCl_4$ in 0.7 ($AlCl_4^-/SO_2NPCl_3^+$) as the electrolyte. However, FIG. 16 in this patent is not showing the known voltage profile as function of x for a cell with a $Li_xMn_2O_4$ ($0 \leq x \leq 1$) cathode and a Lithium metal anode. Moreover, the charge capacity is twice the discharge capacity which means that the efficiency is poor. It was further indicated that this cell behaviour was reversible over 50 cycles.

U.S. Pat. No. 6,552,843 (Innovative Technology Licensing LLC) discloses a reversible electrodeposition device for controlling the propagation of electromagnetic radiation comprising an electrolyte based on ionic liquids comprising a cation based on N-methyl-pyrrolidinium, pyrrolidinium, 1-ethyl-3-methyl-imidazolium, 1-N-butyl-pyridinium, 2-methyl-1-pyrrolinium or 1-ethyl-imidazolium. A reversible electrodeposition device is an electrochemical device that can only operate as an electrolytic cell. Furthermore, the electrodes do not contain intercalation materials.

International patent application WO 02/063073 (B. R. Mattes, W. Lu) discloses the use of ionic liquids in electrochemical devices with conjugated polymers as the active materials in the electrodes. The cation of the ionic liquid is based on pyridinium, pyridazinium, pyrimidinium, pyrazinium, imidazolium, pyrazolium, thiazolium, oxazolium, triazolium, ammonium, pyrrolidinium, pyrrolinium, pyrrolium, and piperidinium. Conjugated polymers are polymer materials with alternating single and double bonds along the polymer chain. No battery related data are disclosed in this prior art reference.

Electrochemical elements for use at a temperature above +60° C. are known from International patent applications WO 0180344 and WO 0209215. The known electrochemical elements comprise a granular electrolyte layer, which is substantially free of polymer binder materials that would evaporate at an elevated temperature. A disadvantage of the use of a granular electrolyte layer is that the physical contact surfaces between the granules are relatively small, which results in a limited transfer of ions via the granules between the cathode and anode, and in a moderate electric power output of the element. The batteries known from these prior art references are suitable for use at a temperature up to about 100° C. and have a limited output of electric power, which is expected to be a result of the limited contact areas between the solid state particles in the electrolyte.

International patent application WO2004/082059 discloses various pyrrolidinium based room temperature ionic liquids for use in energy storage devices, such as secondary lithium batteries.

The present inventions include an electrochemical element with a cathode, an anode and an electrolyte arranged between the cathode and anode, which electrolyte comprises an ionic liquid comprising an anion and a cation, which cation comprises a pyrrolidinium ring structure; and wherein the active material of the cathode comprises an intercalation material having an upper reversible-potential-limit of at most 4 V versus Li/Li$^+$.

The present inventions include a method of providing electrical energy in an underground wellbore, wherein the energy is provided by an electrochemical element according to the invention. The underground wellbore may form part of an oil and/or gas production well or a geothermal well.

BRIEF DESCRIPTION OF THE DRAWINGS

The invention will be described in more detail with reference to the accompanying drawings wherein:

FIGS. 1 A,B and C depict three examples of pyrrolidinium cations comprising a ring structure of four Carbon atoms and one Nitrogen atom;

DETAILED DESCRIPTION OF THE INVENTION

Figure 2:
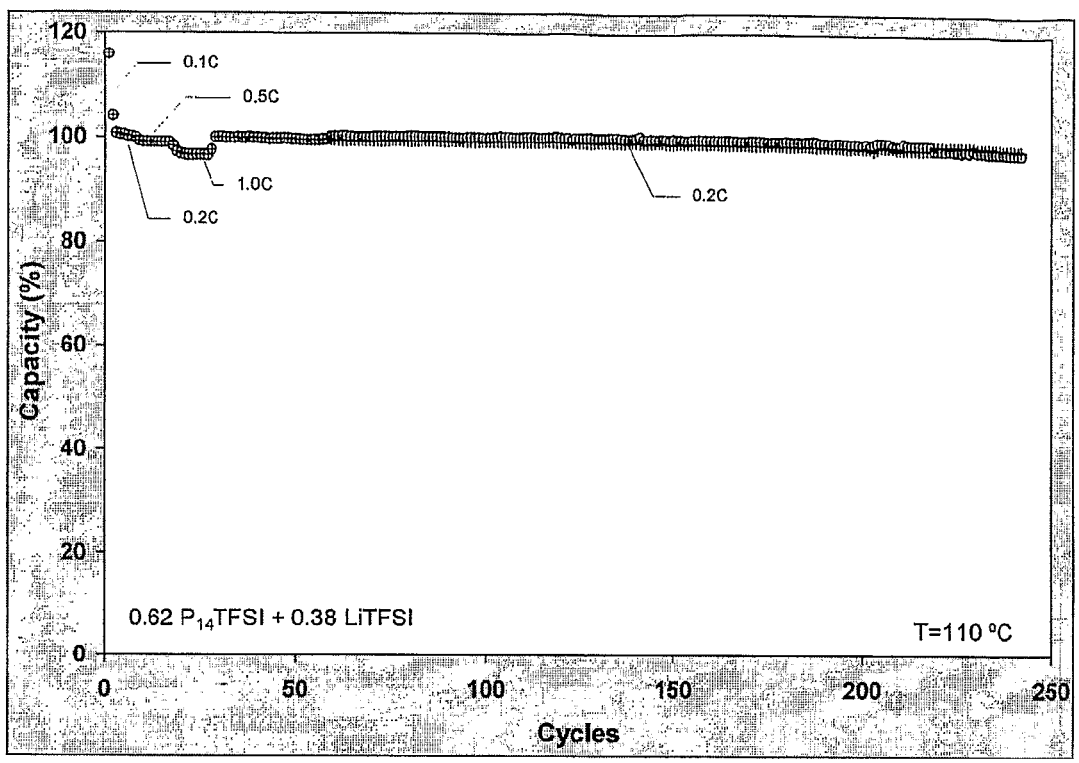
FIG. 2 is a graph showing charge and discharge capacity of the cell with a $Li_4Ti_5O_{12}$ cathode and a Lithium metal anode 110° C. with LiTFSI in $P_{14}$TFSI in the molar ration 0.38:0.62. The capacity is given as percentage of the expected sample capacity based on the active mass and theoretical capacity.

In this specification and claims ionic liquids are defined as 'ionic compounds', which are liquid in the operating temperature range. An ionic liquid may comprise a liquid mixture of ionic compounds.

When used in this specification and claims an active intercalation material is defined as an intercalation material that takes part in the redox reaction in the electrodes.

Intercalation materials with an upper reversible-potential-limit of more than 4 V versus Li/Li$^+$ are not suitable for reversible use. It is believed that the interaction between the electrolyte and these materials cause degradation of the materials and/or electrolyte resulting in loss of capacity, especially when used at temperatures above 70° C.

Suitable intercalation materials with an upper reversible-potential-limit of at most 4 V are for example: LiFePO$_4$, Li$_3$Fe$_2$(PO$_4$)$_3$, Li$_4$Mn$_5$O$_{12}$, Li$_2$Mn$_4$O$_9$, MnO$_2$, FeS$_2$, LiV$_3$O$_8$, V$_2$O$_5$, TiS$_2$, TiO$_2$, Li$_2$Ti$_3$O$_7$, LiTi$_2$(PO$_4$)$_3$, NaTi$_2$(PO$_4$)$_3$, TiP$_2$O$_7$, LiV$_2$O$_4$, Li$_4$Ti$_5$O$_{12}$, LiCrTiO$_4$, LiTi$_2$O$_4$, CuO, MgMo$_3$O$_4$, Li$_3$FeN$_2$, Li$_7$MnN$_4$. Particularly suitable intercalation materials are LiFePO$_4$, Li$_4$Mn$_5$O$_{12}$, TiS$_2$, Li$_4$Ti$_5$O$_{12}$ and LiCrTiO$_4$.

It is observed that WO 01/15258 discloses a solid-state conductive material comprising a pyrrolidinium or other cation. It further discloses that an anode of a Lithium battery may comprise a Lithium intercalation material.

It is believed that a solid-state conductive material has a lower ionic conductivity than an ionic liquid. The use of an ionic liquid in the electrochemical element according to the present invention instead of a solid-state conductive material will result in a higher power density and therefore in a better performance of the electrochemical element.

As an alternative to the use of an active intercalation material the anode of an electrochemical element may comprise a conjugated polymer. International patent application WO02/063073 discloses an electrochemical element with an anode or cathode comprising a conjugated polymer as the major constituent of the active material.

The electrochemical element according to the invention may be configured for use as a primary or a rechargeable battery or an electrochemical capacitor at high temperature, such as a temperature above 50° C. and particularly at a temperature between 60 and 150° C.

It is furthermore preferred that the pyrrolidinium ring structure has the formula: N—R$_1$—N—R$_2$-pyrrolidinium, wherein R$_1$ and R$_2$ are alkyl groups and that R$_1$ is methyl and R$_2$ is butyl or hexyl.

The anion of the ionic liquid preferably comprises any of the following compounds:

ClO$_4^-$, AsF$_6^-$, PF$_6^-$, BF$_4^-$, a halogen ion, N(CF$_3$)$_2^-$, N(CF$_3$SO$_2$)$_2^-$ ("TFSI"), CF$_3$SO$_3^-$, and N(CH$_3$SO$_2$)$_2^-$, N(C$_2$F$_5$SO$_2$)$_2^-$, B(C$_2$O$_4$)$_2^-$, C(CF$_3$SO$_2$)$_3^-$.

It is also preferred that the alkali salt comprises a Lithium salt which may comprise any of the following compounds:

LiN(CF$_3$SO$_2$)$_2$("LiTFSI"), LiCF$_3$SO$_3$, LiClO$_4$, LiBF$_4$, LiPF$_6$, and LiAsF$_6$, LiB(C$_2$O$_4$)$_2$, LiC(CF$_3$SO$_2$)$_3$.

Alternatively the salt may comprise MgCF$_3$SO$_2$ or Mg(ClO$_4$)$_2$.

The cathode suitably comprises Li$_4$Ti$_5$O$_{12}$, Li$_{4-y}$Mg$_y$Ti$_5$O$_{12}$ (0≦y≦1), LiCrTiO$_4$, V$_2$O$_5$, TiS$_2$, Li$_4$Mn$_5$O$_{12}$, Li$_{4-y}$Mg$_y$Mn$_5$O$_{12}$ (0≦y≦1) or Li$_{1-y}$M$_y$FePO$_4$, where M=Mg, Nb, Zr, Ti or Al (0≦y≦0.02), as the active material and as the major constituent by mass.

The anode suitably comprises Lithium, Li$_4$Ti$_5$O$_{12}$, Li$_{4-y}$Mg$_y$Ti$_5$O$_{12}$ (0≦y≦1), LiCrTiO$_4$, as the active material.

FIG. 1A depicts that a pyrrolidinium compound comprises a positively charged ring structure of four carbon atoms and one nitrogen atom. The depicted compound has the formula: N—R$_1$—N—R$_2$-pyrrolidinium, wherein R$_1$ and R$_2$ are alkyl groups and wherein R$_3$-R$_{10}$ are either: H; F; separate alkyl groups which may be branched, substituted and comprise heteroatoms; separate phenyl groups which may be substituted and comprise heteroatoms. In the electrochemical element according to the invention is it preferred that R$_1$ is methyl and R$_2$ is butyl or hexyl or that R$_1$=R$_2$ is butyl.

FIG. 1B depicts the chemical structure of 1-butyl-1-methyl-pyrrolidinium and FIG. 1C depicts the chemical structure of 1-butyl-2,2,3,3,4,4,5,5-octafluoro-1-methyl-pyrrolidinium.

Several rechargeable batteries with electrolytes comprising pyrrolidinium based ionic liquids were made and tested using the manufacturing and testing procedures that are described hereinbelow. Electrolytes were synthesised by mixing pyrrolidinium based ionic liquids and lithium salts. The following acronyms will be used:

P$_{14}$=1-methyl-1-butyl-pyrrolidinium
P$_{16}$=1-methyl-1-hexyl-pyrrolidinium
P$_{44}$=di-butyl-pyrrolidinium
TFSI=bis(trifluoromethylsulfonyl)imide=N(CF$_3$SO$_2$)$_2^-$ P$_{14}$TFSI and P$_{16}$TFSI (acquired from Merck KGaA) were dried under dynamic vacuum at 90° C. for 48 hours. The salts LiTFSI (LiN(CF$_3$SO$_2$)$_2$, 3M) and Lithium-perchlorate (LiClO$_4$, from Alfa Aesar) were dried under dynamic vacuum at 130° C. for 48 hour. After being dried, the materials were transferred into a helium filled glovebox (water content <5 ppm). The following electrolytes were made by mixing the appropriate amounts of ionic liquid and salt, resulting in clear and stable liquids:

5 mol % LiTFSI in P$_{14}$TFSI
0.38 mol LiTFSI in 0.62 mol P$_{14}$TFSI
0.40 mol LiTFSI in 0.60 mol P$_{14}$TFSI
2.0 mol/kg LiTFSI in P$_{16}$TFSI
1.0 mol/kg LiClO$_4$ in P$_{14}$TFSI
0.30 mol LiTFSI in 0.70 mol P$_{44}$TFSI Electrodes were made of LiCrTiO$_4$, Li$_4$Ti$_5$O$_{12}$, LiFePO$_4$ and TiS$_2$ and were coated as follows.

The electrodes were made by the doctor-blade technique on Aluminium or Copper foil current collectors using a paste of the active materials. The pastes contained typically 80 w % active material, 10-13 w % conductive additives, and 7-10 w % of a binder dissolved in 1-methyl-2-pyrrolidon (Merck KGaA). The conductive additives were a mixture of carbon black (2-10%, SuperP from MMM) and graphite (0-10 w %, KS4 from Timcal). The binder was either polyvinylidenefluoride (PVDF, from Solvay) or polymethylmethacrylate (PMMA). LiCrTiO$_4$ and LiFePO$_4$ were synthesised in house, Li$_4$Ti$_5$O$_{12}$ was obtained from Hohsen Corporation Japan, TiS$_2$ was obtained from Alfa Aesar, LiMn$_2$O$_4$ was obtained from Sedema. The coatings were dried at 140° C. for about 15 minutes, densified using a Durston rolling mill, and further dried overnight under dynamic vacuum at 80° C. Finally, samples of 15 mm diameter, with a typical capacity of 1-2 mAh, were punched out and used for testing.

All measurement were done using CR2320 type coincells (23 mm diameter, 2 mm high, 304 steel, acquired from Hohsen Corporation Japan), with polypropylene (PP) or polytetrafluoroethylene (PTFE) gaskets, or in 304 steel cells with high temperature viton O-rings. All cells were assembled in a glovebox. Typically, a cell was made by stacking in a can: an electrode, a 21 mm diameter glassfiber mat (type GF/C, Whatman), a gasket, 4-5 drops of electrolyte with a 1 ml polyethylene pipet, a 17 mm diameter Lithium disk 0.38 mm thick (Chemetall), a 17 mm diameter pressing plate 0.2 mm thick, a 15 mm diameter wave-spring, and a cap which was insulated by tape. If necessary, the electrolyte was warmed to about 100° C. to reduce the viscosity. The cells were closed in a manual CR2320 crimping tool (Hohsen Corporation Japan).

Testing of Batteries

The cells were cycled (subsequent charging and discharging) in air in climate chambers (±0.1° C. accuracy) using Maccor S4000 battery testers. The cells were subjected to various current densities, ranging from 0.1 to 1.0 C-rate. Within a cycle the current was constant and equal for discharging and charging. The 1 C-rate is here defined as the current needed to fully discharge the battery in 1 hour as calculated from the mass of active material and its specific storage capacity. Thus, ideally a 0.1 C-rate discharge lasts for 10 hours and a 2.0 C-rate lasts 0.5 hour.

Example I

"Testing at 110° of a rechargeable battery with a $Li_4Ti_5O_{12}$ cathode, a Lithium metal anode and an electrolyte comprising LiTFSI in $P_{14}$TFSI"

A coincell was made according to the procedures described above. $Li_4Ti_5O_{12}$ was used as the cathode material with PvdF as binder on an Aluminium current collector. The electrolyte was a mixture of LiTFSI dissolved in $P_{14}$TFSI in the molar ratio of 0.38:0.62. The cell was cycled 242 times between 1.0 and 2.0 V at 110° C.

Figure 3:
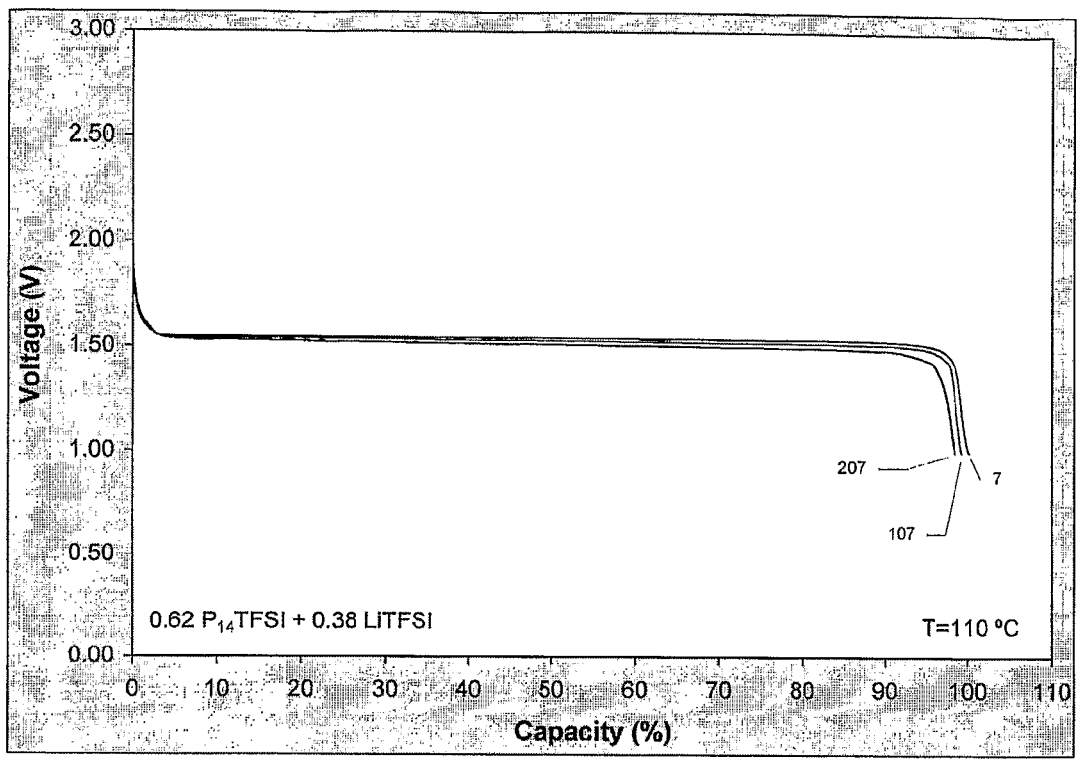
FIG. 3 is a graph showing voltage curves for cycle number 7, 107 and 207 of the cell with a $Li_4Ti_5O_{12}$ cathode and a Lithium metal anode 110° C. with LiTFSI in $P_{14}$TFSI in the molar ration 0.38:0.62.

In the first 29 cycles the current was varied between 0.1 and 1.0° C. FIG. 2 shows the capacity for discharging and charging as percentage of the expected sample capacity. Very stable cycling behaviour of the battery was found with good rate capability and high efficiency. The voltage curves in FIG. 3 show the typical voltage curve of $Li_4Ti_5O_{12}$ versus lithium for the 7-th, 107-th and 207-th cycle for the same current density indicating that the active material did not change and did not loose its integrity.

Example II

"Testing at 110° C. of a rechargeable battery with a $Li_4Ti_5O_{12}$ cathode, a Lithium metal anode and an electrolyte comprising LiTFSI in $P_{16}$TFSI"

A coincell was made according to the procedures described above. $Li_4Ti_5O_{12}$ was used as the cathode material with PvdF as binder on an Aluminium current collector. The electrolyte was a 2.0 mol/kg mixture of LiTFSI dissolved in $P_{16}$TFSI. The cell was cycled 150 times between 1.0 and 2.0 V at 110° C.

Figure 4:
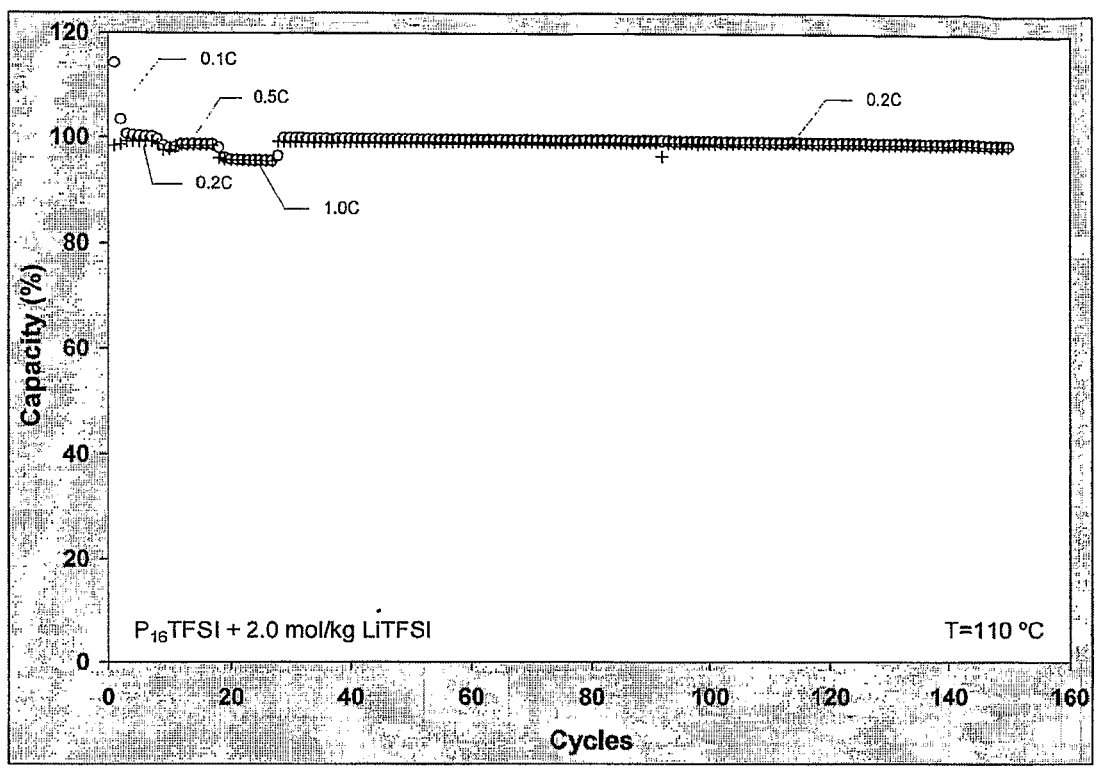
FIG. 4 is a graph showing charge and discharge capacity of the cell with a $Li_4Ti_5O_{12}$ cathode and a Lithium metal anode 110° C. with 2.0 mol/kg LiTFSI in $P_{16}$TFSI. The capacity is given as percentage of the expected sample capacity based on the active mass and theoretical capacity.

In the first 29 cycles the current was varied between 0.1 and 1.0° C. FIG. 4 shows the capacity for discharging and charging as percentage of the expected sample capacity. Very stable cycling behaviour of the battery was found with good rate capability and high efficiency.

Example III

"Testing at 110° C. of a rechargeable battery with a $TiS_2$ cathode, a Lithium metal anode and an electrolyte comprising LiTFSI in $P_{14}$TFSI"

A coincell was made according to the procedures described above. $TiS_2$ was used as the cathode material with PvdF as binder on an Aluminium current collector. The electrolyte was a mixture of LiTFSI dissolved in $P_{14}$TFSI in the molar ratio of 0.40:0.60. The cell was cycled 13 times between 1.8 and 2.5 V and 87 times between 1.5 and 2.5 V at 110° C.

Figure 5:
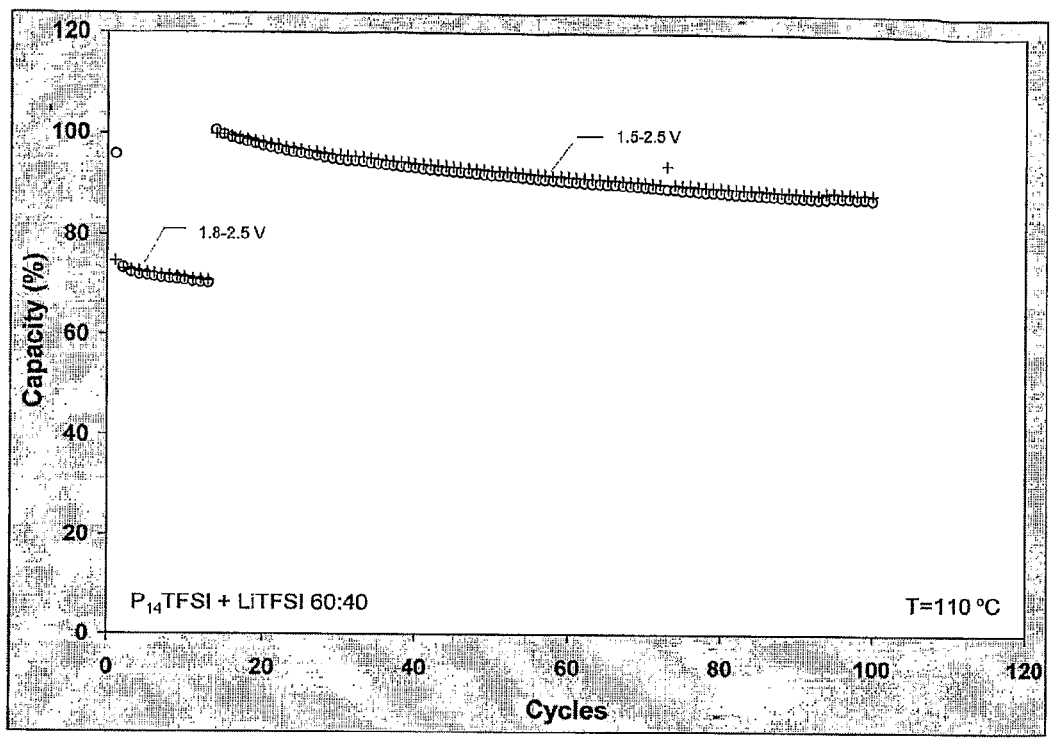
FIG. 5 is a graph showing charge and discharge capacity of the cell with a $TiS_2$ cathode and a Lithium metal anode 110° C. with LiTFSI in $P_{14}$TFSI in the molar ration 0.40:0.60. The capacity is given as percentage of the expected sample capacity based on the active mass and theoretical capacity.
Figure 6:
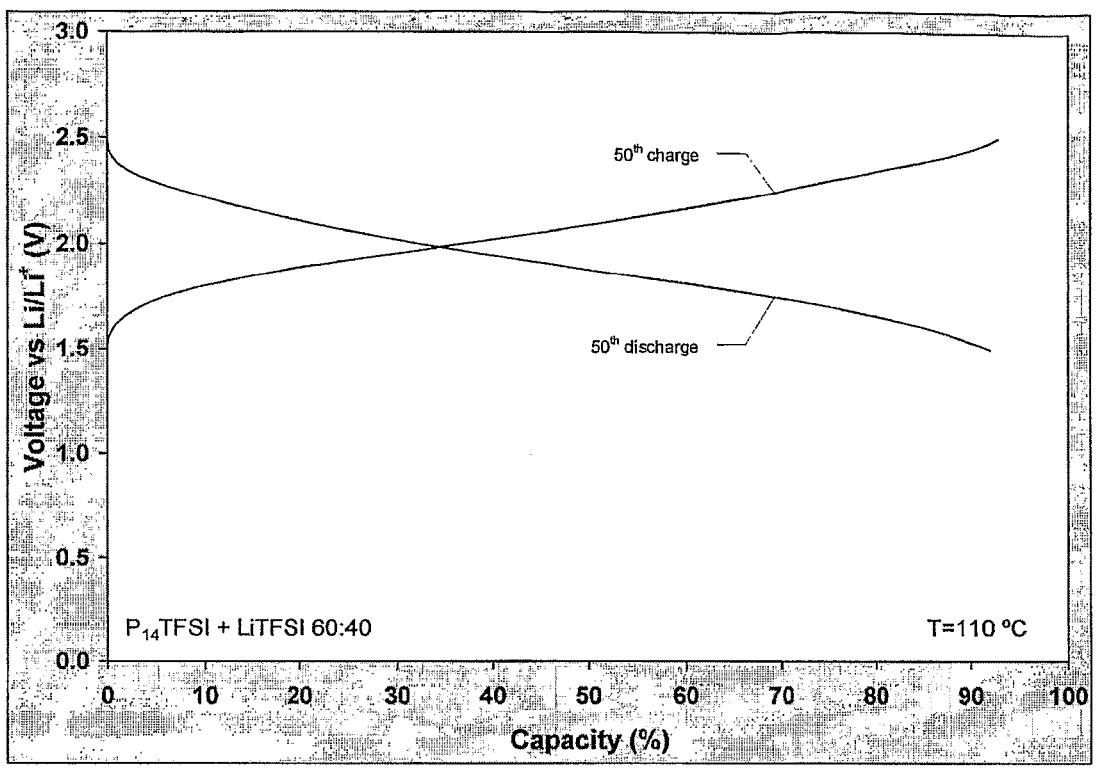
FIG. 6 is a graph showing voltage curve for cycle 50 of the cell with a $TiS_2$ cathode and a Lithium metal anode 110° C. with LiTFSI in $P_{14}$TFSI in the molar ration 0.40:0.60.

FIG. 5 shows the capacity for discharging and charging as percentage of the expected sample capacity. The lowering of the lower cut-off voltage increased the capacity substantially. Apart from some initial fading the cycling is fairly stable and with high efficiency. The voltage curves in FIG. 6 shows the typical voltage curve of $TiS_2$ versus lithium for the 50-th cycle.

Example IV

"Testing at 150° C. of a rechargeable battery with a $Li_4Ti_5O_{12}$ cathode, a Lithium metal anode and an electrolyte comprising LiTFSI in $P_{44}$TFSI"

A coincell was made according to the procedures described above. $Li_4Ti_5O_{12}$ was used as the cathode material with PvdF as binder on an Aluminium current collector. The electrolyte was a mixture of LiTFSI dissolved in $P_{44}$TFSI (di-butyl-pyrrolidinium-TFSI) in the molar ratio 0.30:0.70. The cell was cycled 60 times between 1.0 and 2.0 V at 150° C. The current was varied between a 0.1, 0.5, and 1.0 C-rate.

Figure 7:
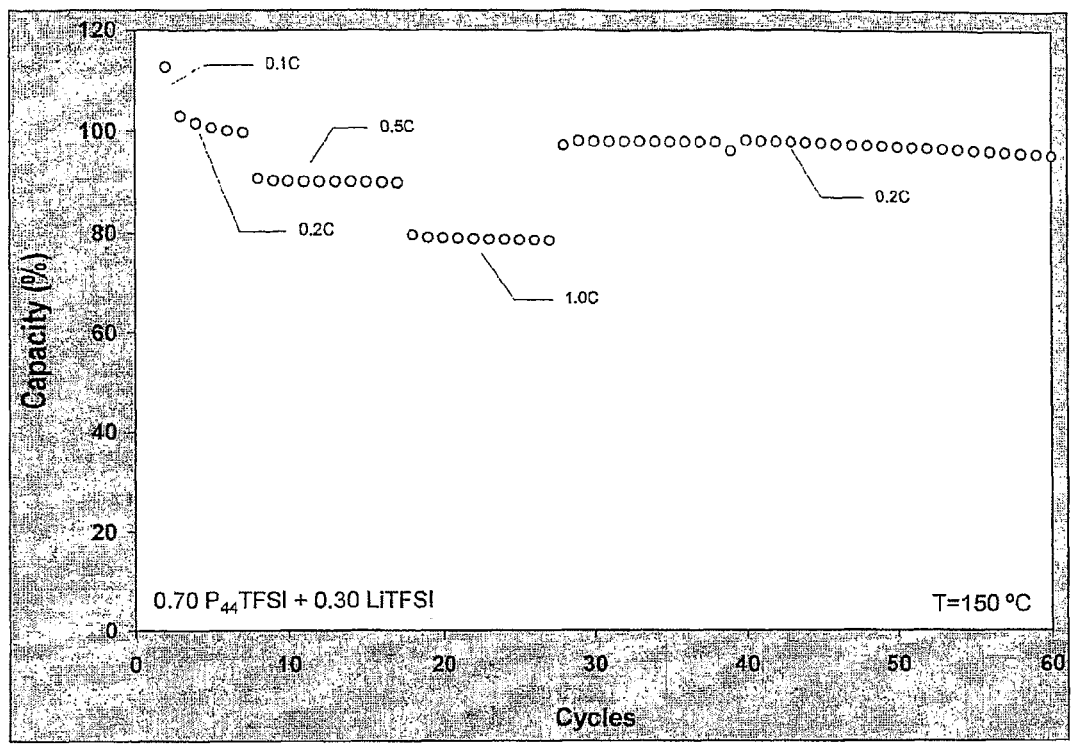
FIG. 7 is a graph showing charge and discharge capacity of the cell with a $Li_4Ti_5O_{12}$ cathode and a Lithium metal anode 150° C. with LiTFSI in $P_{44}$TFSI in the molar ration 0.30:0.70. The capacity is given as percentage of the expected sample capacity based on the active mass and theoretical capacity.

FIG. 7 shows the capacity for discharging and charging as percentage of the expected sample capacity. Even at 150° C. the cycling stability is very good and similar to that at 110° C. demonstrating the use of these electrolytes in high temperature batteries.

Example V

"Testing at 110° C. of a rechargeable battery with a 4.1 V $LiMn_2O_4$ cathode, a Lithium metal anode and an electrolyte comprising LiTFSI in $P_{14}$TFSI or $P_{16}$TFSI"

Three coincells were made according to the procedures described above. $LiMn_2O_4$ was used as the cathode material with PvdF as binder on a 304-steel current collector. The electrolytes were:

A. 1 M $LiPF_6$ in EC/DMC 2:1 w/w;
B. 0.05 mol LiTFSI dissolved in 0.95 mol $P_{14}$TFSI
C. 1 mol/kg LiTFSI dissolved in $P_{16}$TFSI The cells were charged and discharged between 3.5 and 4.3 V at 25° C. for electrolyte A and at 110° C. for electrolyte B and C. The current was a 0.1 C-rate.

Figure 8:
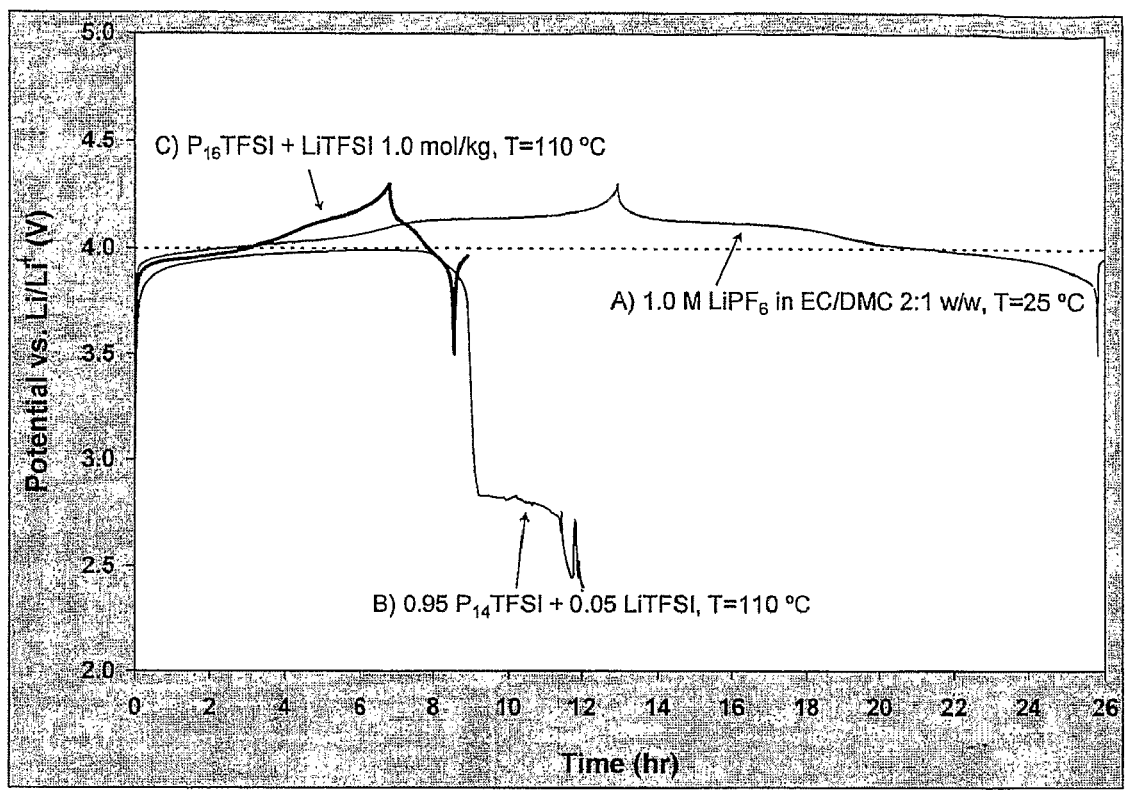
FIG. 8 is a graph showing the potential curves of three cells with a $LiMn_2O_4$ cathode and a Lithium metal anode. Cell A contains a reference electrolyte based on organic solvents at 25° C. and shows the expected characteristic potential curve. Cells B and C contain pyrrolidinium based electrolytes at 110° C. and show failure of the cells starting.

FIG. 8 shows the potential curves for the three cells. The reference cell with electrolyte A shows the expected characteristic potential curve for $LiMn_2O_4$ being symmetrical in charge and discharge. The cell with electrolyte B did not reach a potential higher than 4 V and failed. The cell with electrolyte C showed a too small charge capacity and an even smaller discharge capacity. The specific $LiMn_2O_4$ potential curve is lost and the capacity faded quickly. These tests demonstrate that the pyrrolidinium based electrolytes cannot be used with intercalation materials which have an upper reversible-potential-limit higher than 4 V versus $Li/Li^+$.

Example VI

"Testing at 110° C. of a rechargeable battery with a 3.4 V $LiFePO_4$ cathode, a Lithium metal anode and an electrolyte comprising LiTFSI in $P_{14}$TFSI"

A coincell was made according to the procedures described above. $LiFePO_4$ was used as the cathode material with PvdF as binder on an Aluminium current collector. The electrolyte was a mixture of LiTFSI dissolved in $P_{14}$TFSI in the molar ratio 0.40:0.60. The cell was cycled between 3.0 and 3.8 V as the upper cut-off potential at 110° C. The current was a 0.1 C-rate.

Figure 9:
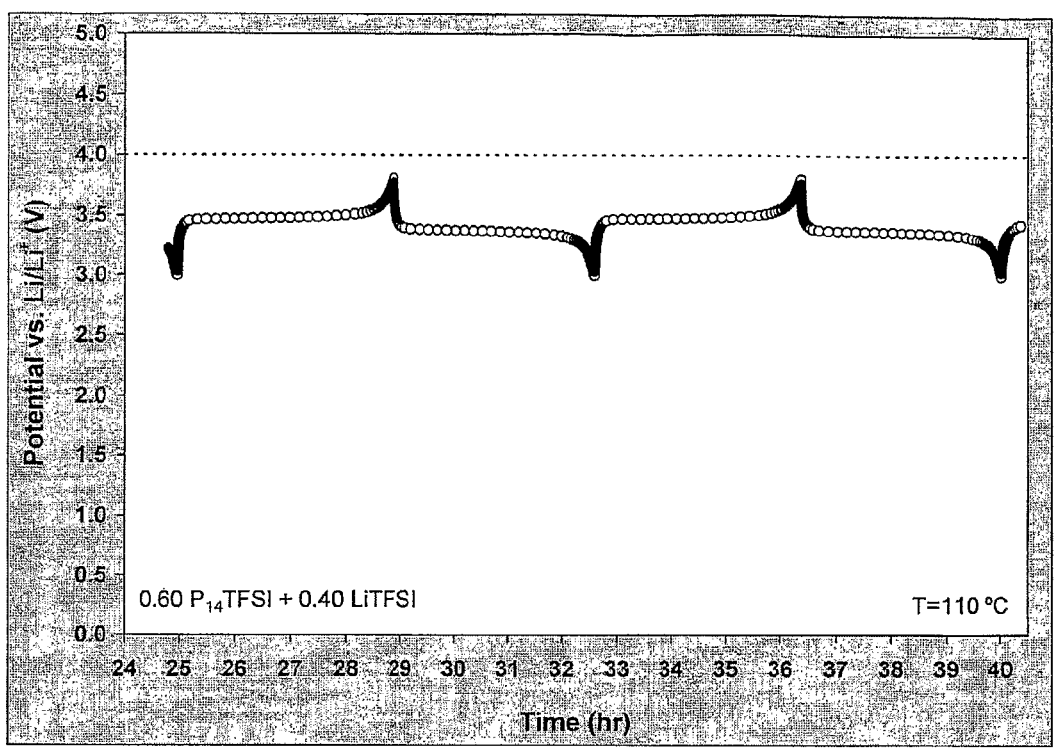
FIG. 9 shows the characteristic flat potential curve for $LiFePO_4$ cathode and a Lithium metal anode 110° C. with LiTFSI in $P_{14}$TFSI in the molar ration 0.40:0.60. The potential is given as function of time.

FIG. 9 shows the characteristic flat potential curve for LiFePO$_4$, being symmetrical for charge and discharge. This tests demonstrates that the pyrrolidinium based electrolytes can be used with intercalation materials with an upper reversible-potential-limit up to 4 V versus Li/Li$^+$.

EXAMPLES I-VI and FIG. 1-9 demonstrate that the tested cells with pyrrolidinium based ionic liquid electrolytes and with a cathode comprising an intercalation material having an upper reversible-potential-limit (RPL$_{upp}$) of at most 4 V versus Li/Li$^+$ are suitable for use as rechargeable batteries at a high temperature of up to at least 150° C.

The examples further indicate that suitable materials for use in the rechargeable batteries are:

Li$_4$Ti$_5$O$_{12}$, Li$_4$Mn$_5$O$_{12}$, LiCrTiO$_4$, and TiS$_2$ as active intercalation materials.

It is also believed that other known intercalation materials as for example Li$_{1+y}$Mn$_{2-y}$O$_4$ (~2.9 V insertion, $0 \leq y \leq 1/3$), LiMg$_y$Ni$_{0.5-y}$Mn$_{1.5}$O$_4$ (~2.9 V insertion, $0 \leq y \leq 0.5$), Li$_2$Mn$_4$O$_9$ (~2.9 V insertion), Li$_7$MnN$_4$, and Li$_3$FeN$_2$ can be used.

Aluminium and stainless steel SUS304 as a current collector materials.

It is also believed that other materials as for example Nickel, Copper, Gold, Platinum, Carbon, and Graphite can be used as current collectors.

PvdF and PMMA as binder materials.

It is also believed that other known binder materials as for example PTFE, PCTFE, ECTFE, ETFE, and FEP can be suitable binder materials.

Carbon black and graphite as conductive additives.

It is also believed that instead or together with Carbon black and Graphite it is possible to use a metal foam or similar porous but electronically conductive structure, glassy carbon, or a metal powder as a conductive matrix in the electrodes. This can be an advantage in case Carbon black and/or graphite cause unwanted side reactions with other materials in the battery.

porous glassfiber mat as separator material.

It is also believed that for example porous layers comprising Al$_2$O$_3$, MgO, Li-β-Alumina are suitable separator materials.

Mixtures of P$_{14}$TFSI, P$_{16}$TFSI and P$_{44}$TFSI with LiTFSI and/or LiClO$_4$.

We claim:

1. An electrochemical device comprising a cathode, an anode and an electrolyte arranged between the cathode and anode, wherein the electrolyte comprises an ionic liquid comprising an anion and a cation, which cation has the formula N-methyl-N-hexyl-pyrrolidinium,
wherein the active material of the cathode comprises as its major constituent by mass an intercalation material having an upper reversible-potential-limit of at most 4 V versus Li/Li$^+$ and comprising any of the following compounds: Li$_4$Ti$_5$O$_{12}$, LiTi$_2$O$_4$, Li$_{4-y}$Mg$_y$Ti$_5$O$_{12}$ ($0 \leq y \leq 1$), V$_2$O$_5$, Li$_4$Mn$_5$O$_{12}$, or Li$_{4-y}$Mg$_y$Mn$_5$O$_{12}$ ($0 \leq y \leq 1$).

2. The electrochemical device of claim 1, wherein the electrochemical device is a primary battery or a rechargeable battery or an electrochemical capacitor.

3. The electrochemical device of claim 1, wherein the electrochemical device is configured for use at a temperature between 50 and 200° C.

4. The electrochemical device of claim 3, wherein the electrochemical device is configured for use at a temperature between 60 and 200° C.

5. The electrochemical device of claim 1, wherein the N-methyl-N-hexyl-pyrrolidinium structure is:

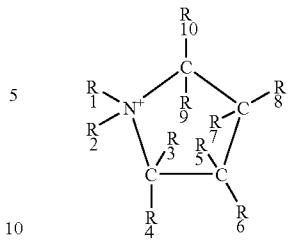

wherein R$_1$ is a methyl group, R$_2$ is a hexyl group, and R$_3$-R$_{10}$ are selected from the group consisting of: H, F, separate alkyl groups which may be branched, substituted and comprise heteroatoms, and separate phenyl groups which may be substituted and comprise heteroatoms.

6. The electrochemical device of claim 1, wherein the anion of the ionic liquid comprises any of the following compounds:

ClO$_4^-$, PF$_6^-$, BF$_4^-$, AsF$_6^-$, a halogen ion, N(CF$_3$)$_2^-$, N(CF$_3$SO$_2$)$_2^-$, CF$_3$SO$_3^-$, N(CH$_3$SO$_2$)$_2^-$, N(C$_2$F$_5$SO$_2$)$_2^-$, B(C$_2$O$_4$)$_2^-$, or C(CF$_3$SO$_2$)$_3^-$.

7. The electrochemical device of claim 1, wherein the electrolyte further comprises a salt.

8. The electrochemical device of claim 7, wherein the salt comprises an alkali salt.

9. The electrochemical element of claim 1, wherein the cathode or anode comprises polyvinylidenefluoride (PVDF) as a binder material.

10. The electrochemical element of claim 1, wherein the cathode or anode comprises polytetrafluoroethylene (PTFE) as a binder material.

11. An electrochemical device comprising a cathode, an anode and an electrolyte arranged between the cathode and anode, wherein the electrolyte comprises an ionic liquid comprising an anion and a cation, which cation has a pyrrolidinium ring structure,
wherein the active material of the cathode comprises as its major constituent by mass an intercalation material having an upper reversible-potential-limit of at most 4 V versus Li/Li$^+$ and comprising any of the following compounds: Li$_4$Ti$_5$O$_{12}$, LiTi$_2$O$_4$, Li$_{4-y}$Mg$_y$Ti$_5$O$_{12}$ ($0 \leq y \leq 1$), V$_2$O$_5$, Li$_4$Mn$_5$O$_{12}$, or Li$_{4-y}$Mg$_y$Mn$_5$O$_{12}$ ($0 \leq y \leq 1$);
wherein the electrolyte further comprises a salt comprising MgCF$_3$SO$_2$ or Mg(ClO$_4$)$_2$.

12. An electrochemical device comprising a cathode, an anode and an electrolyte arranged between the cathode and anode, wherein the electrolyte comprises an ionic liquid comprising an anion and a cation, wherein the cation has a pyrrolidinium ring structure, wherein the cathode comprises LiCrTiO$_4$ as the major constituent by mass of the active material.

13. The electrochemical device according to claim 12 wherein the electrochemical device is a primary battery or a rechargeable battery or an electrochemical capacitor.

14. The electrochemical device according to claim 12 wherein the pyrrolidinium ring structure has the formula N-methyl-N-hexyl-pyrrolidinium.

15. An electrochemical device comprising a cathode, an anode and an electrolyte arranged between the cathode and anode, wherein the electrolyte comprises an ionic liquid comprising an anion and a cation, wherein the cation has a pyrrolidinium ring structure, wherein the cathode comprises TiS$_2$ as the major constituent by mass of the active material.

16. The electrochemical device according to claim 15 wherein the electrochemical device is a primary battery or a rechargeable battery or an electrochemical capacitor.

17. The electrochemical device according to claim 15 wherein the pyrrolidinium ring structure has the formula N-methyl-N-hexyl-pyrrolidinium.

18. An electrochemical device comprising a cathode, an anode and an electrolyte arranged between the cathode and anode, wherein the which electrolyte comprises an ionic liquid comprising an anion and a cation, wherein the cation has a pyrrolidinium ring structure, wherein the cathode comprises $Li_{1-y}M_yFePO_4$, where M=Mg, Nb, Zr, Ti, or Al and ($0 \leq y \leq 0.02$), as the major constituent by mass of the active material.

19. The electrochemical device according to claim 18 wherein the electrochemical device is a primary battery or a rechargeable battery or an electrochemical capacitor.

20. The electrochemical device according to claim 18 wherein the pyrrolidinium ring structure has the formula N-methyl-N-hexyl-pyrrolidinium.

* * * * *